Sept. 15, 1953     S. M. GRISWOLD ET AL     2,651,857
COVER FOR TEMPORARY PROTECTION OF SHOES
Filed April 18, 1950     2 Sheets—Sheet 1
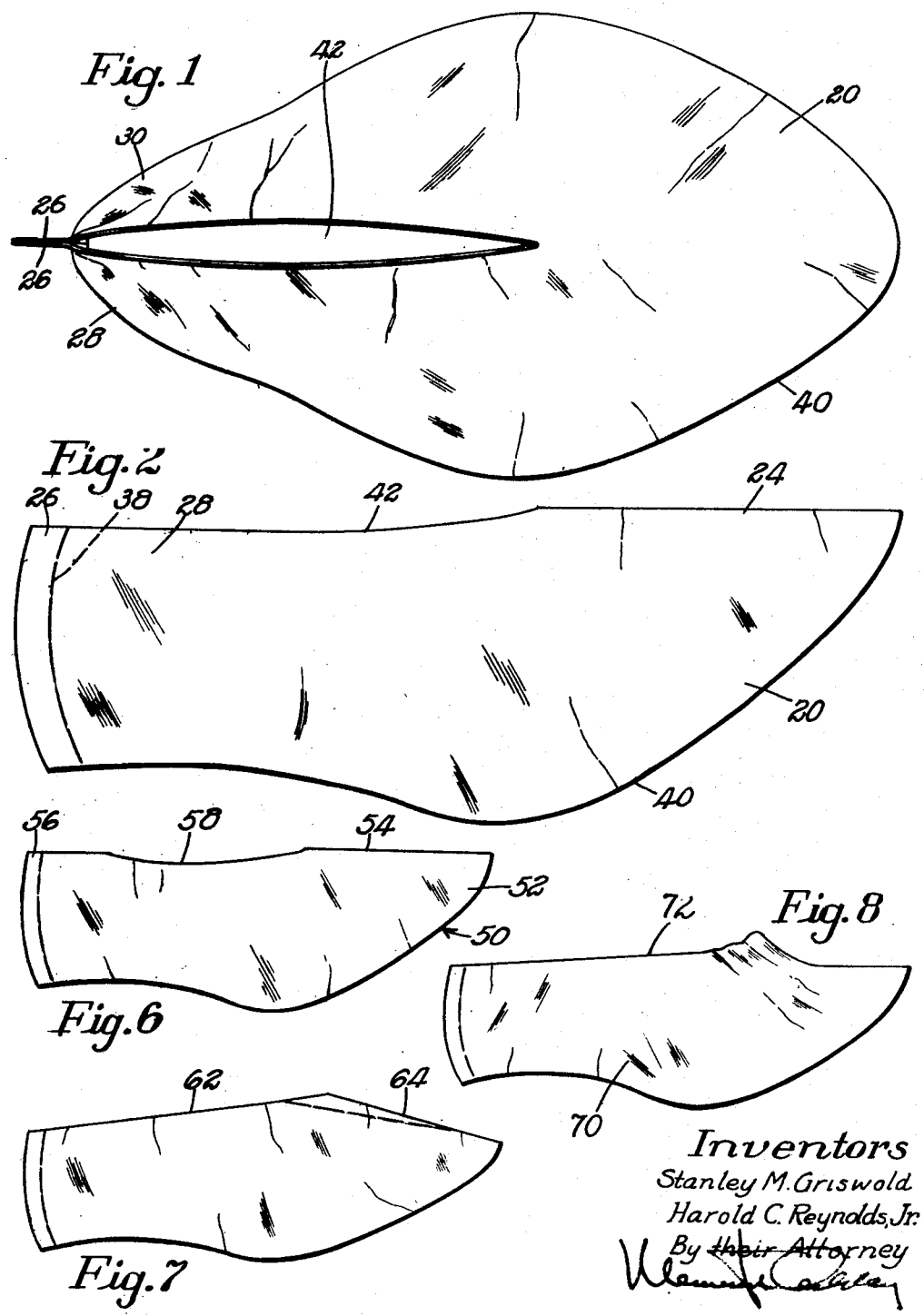
Inventors
Stanley M. Griswold
Harold C. Reynolds, Jr.
By their Attorney Sept. 15, 1953　　　S. M. GRISWOLD ET AL　　　2,651,857
COVER FOR TEMPORARY PROTECTION OF SHOES
Filed April 18, 1950　　　　　　　　　　　　2 Sheets-Sheet 2
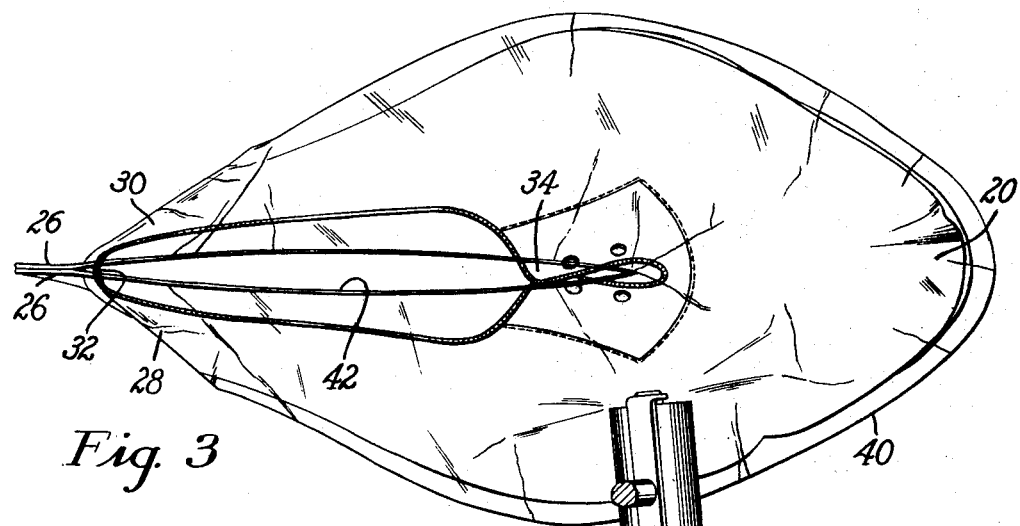
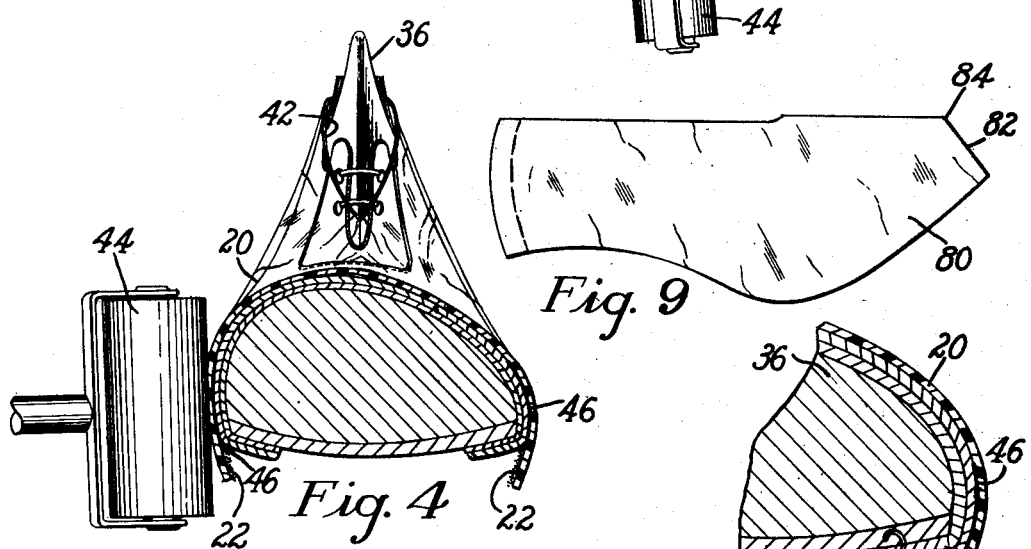
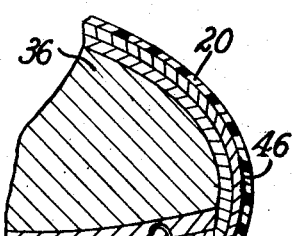
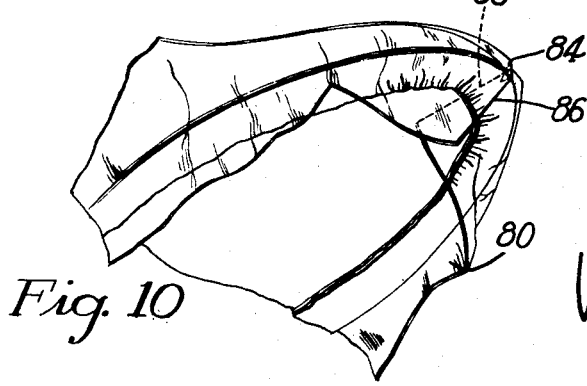
Inventors
Stanley M. Griswold
Harold C. Reynolds, Jr.
By their Attorney Patented Sept. 15, 1953

2,651,857

UNITED STATES PATENT OFFICE 2,651,857

COVER FOR TEMPORARY PROTECTION OF SHOES

Stanley M. Griswold, West Newton, and Harold C. Reynolds, Jr., Belmont, Mass., assignors to B. B. Chemical Co., Boston, Mass., a corporation of Massachusetts Application April 18, 1950, Serial No. 156,588

2 Claims. (Cl. 36—72)

This invention relates to temporary protective covers for shoes and to a method for protecting the uppers of shoes from being soiled or stained during various shoemaking operations.

Temporary protective coverings for shoe uppers are used to prevent soiling or staining in the course of manufacturing. These coverings must remain in protective relation to the shoe upper during manufacture but must be readily removable when the need for protection is past. Ideally, a protective cover sheet should be constructed to remain in place when it is simply laid in protective relation. Protective coverings carrying a coating of so-called "pressure-sensitive adhesive" will remain in place, but heavy pressure exerted on the toe portion and elsewhere on the upper during sole-attaching, leveling or other operations acts to increase the adhesion between the cover and the upper to such an extent as to make removal difficult. Pressure-sensitive adhesives in common with most conventional adhesives present the further difficulty that after separation of the cover some of the adhesive remains on the shoe; or the surface of the shoe is harmed in the course of removal of the cover.

The so-called "pressure-sensitive" adhesives consist of a permanently plastic solution of high molecular weight rubber in a low molecular weight non-volatile solvent which may be either a resin or a lower molecular weight molecule of the same or a similar rubber. When these adhesives are pressed against surfaces, they tend to conform to the unevenness of the surfaces. When pressure-sensitive adhesives are stripped from surfaces they resist the stripping with a force resulting from physical interaction between the adhesive and the unevenness of the surface to which the adhesive has conformed. The ingredients of this type of adhesive usually are non-polar, i. e., there are no electrical forces due to polar groups which will attract the adhesive to the surface. Also the chain molecules which give strength to the adhesive are not regular enough to provide, or have side substituents which prevent, adhesion due to residual electrical bonding forces of the atoms.

When a pressure-sensitive adhesive, for example a plastic rubber composition, is used to bond a cover in protective relation to a porous surface, the initial strength of the bond may be small; and initially the cover may be readily stripped from the object. But since the adhesive is permanently plastic it will penetrate deeper and deeper into the pores of the surface until the stripping force required due to interaction between adhesive and the unevenness, i. e. the pores, will be so large that the cover can be stripped only with great difficulty. The force may even become greater than the cohesion of the film of adhesive and part of the adhesive may be left on the surface.

A second type of adhesion depends on the electrical attraction between the adhesive and the surface as well as on keying of the adhesive to the surface. This attraction, which operates over a relatively long distance, is due to the charge distribution about the atomic groups in the adhesive and on the surface and is electromagnetic in character. An example of a polar type of adhesive is a mixture of an acrylonitrile butadiene copolymer rubber and a phenolic resin which contain the strongly polar —CN and —OH groups and which are used to attach synthetic rubber soles containing —Cl and —COOCH$_3$ groups to strongly polar leather containing —CONH— groups. Adhesives of this second type containing polar groups have too much bonding power to be used as adhesives for temporary protective cover. Either the cohesion of the adhesive will be overcome leaving the adhesive on the surface being protected or, more commonly, the surface of the object such as a shoe surface will be damaged on stripping.

It is a feature of the present invention to provide an improved process for securing a temporary protective cover on a shoe by a non-pressure-sensitive coating on the cover wherein the coating is temporarily brought to a condition in which it can readily form a relatively weak bond with a shoe, and while in that condition is secured to a shoe by slight pressure.

It is a further feature to provide a shoe cover adapted for rapid positioning on a shoe, the cover being formed of thin, flexible sheet material having firmly bonded to one side thereof a non-pressure-sensitive coating adapted to be brought to a temporary condition in which it will form a relatively weak bond with a shoe against which it may be pressed.

The temporary protective cover of our invention is a flexible, preferably stretchable sheet conforming generally to the shape of the shoe to be covered and having a special non-pressure-sensitive heat activatable coating bonded to the sheet. This adhesive is an intimate mixture of a high molecular weight organic polymer, preferably a natural or synthetic rubber and a low molecular weight non-polar or weakly polar normally crystalline organic compound such as a wax.

To protect a shoe with this cover according to the method of our invention, the cover is placed on the shoe in position to overlie the area to be protected. Heat is applied to the outside of the cover and the cover is pressed lightly against the shoe to bring the softened adhesive against the shoe surface and form a bond.

The low molecular weight component of the adhesive when melted by heat acts to dissolve or soften the high molecular weight polymer and forms with the high molecular weight polymer a tacky, pressure-sensitive adhesive which is only slightly polar. In the pressure-sensitive condition the adhesive penetrates to a limited extent the pores of the shoe surface against which the composition is pressed and conforms to the unevenness of that surface to form a bond of the pressure-sensitive type. On cooling, the low molecular weight compound undergoes a change of state, presumably crystallization, and no longer acts to soften the high molecular weight polymer. The adhesive composition loses pressure-sensitivity and plasticity and will no longer penetrate further into the pores of the surface even when strongly pressed. The adhesive also shrinks in volume; and the existing bond to the surface is weakened by reduction of the depth of penetration of the adhesive into the pores and unevenness of the surface. The cooled cover is readily stripped from the surface when desired since the force holding the cover in place consists mostly of the weakened physical engagement between the adhesive and the unevennesses of the surface. The cohesiveness of the adhesive is increased by cooling so that when the protective cover is stripped from the surface, the adhesive does not in any case separate from the film and remain on the surface.

The invention will be further described in connection with the accompanying drawings forming part of the present disclosure. In the drawings, Fig. 1 is a plan view of a protective cover according to the present invention;

Fig. 2 is an elevational view of the cover;

Fig. 3 is a plan view of a shoe upper with a protective cover thereon and illustrating an optional preliminary bonding step;

Fig. 4 is a transverse vertical sectional view of a lasted shoe upper with a temporary protective cover thereon, illustrating the bonding of a shoe cover to a lasted shoe upper;

Fig. 5 is a fragmentary transverse vertical sectional view similar to Fig. 4 showing a shoe cover bonded to a lasted shoe upper;

Figs. 6, 7 and 8 are elevational views of modified forms of the cover of the present invention;

Fig. 9 is an elevational view of a further modified form of the cover of the present invention; and Fig. 10 is an angular view of a lasted shoe upper with the cover of Fig. 9 disposed thereon in position to be temporarily bonded thereto.

In the following description of protective covering operations, the operations will be explained in connection with the application of a cover generally shaped to cover a shoe on a last since that is ordinarily the most convenient procedure. However, it is an important advantage of the method of the present invention that it is applicable to the protection of the most diverse types of shoes and of isolated parts of shoes. Thus, protection may be provided for only the light colored or suede portions of shoes, or entire uppers of mixed materials may be covered. It is a unique property of the new method that the strength of bond to a shoe surface is substantially independent of the material of the shoe surface. Thus, the same readily rupturable bond is formed with smooth surfaces such as calf or patent leather and rough surfaces such as buck or suede; and no variation in treatment is required for covering shoes formed of a variety of leathers. Protective sheet material of the approximate size and shape of the area to be covered may be placed over the whole or over any part of a shoe and secured in place by lightly pressing it with a heated tool. It may be bonded over its whole area or bonded only in areas, for example at the edges, disposed to hold the cover in place. The bonded protective sheet remains in place as long as needed and then is readily and cleanly stripped from the protected area.

Figs. 1 to 5 show a shoe cover 20 in the form of a thin flexible film or sheet having on one side a special normally non-pressure-sensitive heat activatable coating 22 of adhesive which will adhere only lightly to a shoe when pressed against it in heated condition. The sheet 20 is bent along a line 24 extending lengthwise approximately in the center of the sheet, hereinafter referred to as a median line, and opposed margins 26 at one end of the sheet are secured together, the closed end and the sides 28 and 30 defining a pocket for receiving the heel portion 32 of an upper 34 on a last 36. In the form illustrated, these margins 26 have been secured together adhesively by pressing them together and heating them to activate the adhesive coating and bond adjacent areas together along a curved line 38 which corresponds at least roughly to the curve of the heel portion 32. The free edges 40 of the sheet 20 have an outline shape approximating that of a shoe upper, and of sufficient length and width so that when disposed on a shoe upper, the edges 40 will extend to the lasting margin of the shoe upper with which the cover is to be used.

An opening or slit 42 through which portions of a last 36 may extend may be provided along the median line reaching to a point forward of the apex of the forepart cone of the last 36 when the cover is in protective position to a shoe upper 34 on a last 36.

Our protective cover comprises a base sheet preferably formed of cyclized rubber commonly known as "Pliofilm," carrying the special adhesive on one surface. Other base sheet materials which may be used include known flexible plastic films having softening temperatures above 190° F. and paper. The preferred adhesive is a combination of a wax and a high molecular weight rubbery polymer in the ratio of from 1:4 to 4:1. Within these ranges of proportions, the wax softens or swells and plasticizes the rubbery polymer when the composition is heated; and the composition in heated condition is pressure sensitive. At room temperatures the wax apparently crystallizes and no longer serves to soften or plasticize the rubbery polymer, and the composition shrinks in volume and loses pressure sensitivity. The coating of adhesive may be from .001 to .0030 inch and preferably about .002 inch in thickness. Between the layer or coating of special adhesive and the base sheet there is provided a bonding precoat which holds the special adhesive coating on the sheet. That is, in cooled condition, the special adhesive possesses cohesive strength sufficient to prevent rupture within the adhesive when the cover sheet is stripped from a surface; but, without the bonding precoat, the strength of its adhesion to a base sheet, such as the cyclized rubber sheet, might be weaker than the strength of its adhesion to the surface and the special adhesive might adhere to the surface rather than to the cover sheet when the cover sheet is stripped from the surface.

The rubbery polymer component of the special adhesive may be any of the natural or synthetic rubbers or mixtures of these, thus satisfactory compositions have been prepared wherein the rubber component is natural rubber alone, or in mixture with a butadiene styrene copolymer comprising from 50% to 75% styrene, e. g. in the ratio of one part by weight of copolymer to from one to four parts of natural rubber, or butadiene acrylonitrile copolymer rubbers having an acrylonitrile content of 16% alone or in admixture with natural rubber. "Butyl rubber" (GRI), a polymer of a diolefin and a polyolefin is also useful. High linear polymeric materials which may be used in place of the rubbers mentioned include the above-mentioned butadiene styrene copolymers, and polymers of isobutylene, styrene, vinyl compounds such as vinyl acetate and ethylene. Polymers suitable for use will in general have softening temperatures above 150° F.

With the above high polymeric materials there is employed a wax having a melting point above 120° F. Suitable waxes are crystalline, non-polar or weakly polar organic compounds including such materials as paraffin wax, low molecular weight polyethylene, bees wax, montan wax, carnauba wax and Ceresin wax. The waxes may be employed in the proportion of from four parts of wax to one part of the high molecular weight rubbery polymer to one part of wax to four parts by weight of the high molecular weight rubbery polymer. Preferred compositions comprise wax and rubbery polymer in the ratio of from 1:2 to 2:1 parts by weight.

The wax component of the special adhesive is at most weakly polar and the blend of wax with rubbery polymer is only slightly polar. The cyclized rubber of the cover sheet is somewhat more polar although by no means strongly polar. To establish a satisfactory bond between the cover sheet and the special adhesive, we employ a bonding precoat on the cover sheet comprising semi-polar materials capable of bonding to both non-polar and somewhat polar compositions. Semi-polar materials which we have found effective to bond the special adhesive to the cover sheet include oil-soluble phenolic resins such as Bakelite resins BR 254, a heat reactive 100% phenol-aldehyde resin having a softening point of 175° to 205° F. and a specific gravity of 1.117, and BR 3360, a non-heat reactive 100% paraphenyl-phenol aldehyde resin having a softening point of 195° to 225° F. and a specific gravity of 1.21, phenolated rubber such as Durez 5117, chlorinated hydrocarbon polymers containing at least 20% chlorine, such as chlorinated Vistanex polybutene and equivalent materials such as cyclized rubber.

In shoemaking procedure using the cover 20, the temporary protective cover 20 is placed in protective relation to the upper 34 with the heel portion 32 of the upper in the pocket formed by the joined margins 26 and the sides 28 and 30 at the end of the cover 20, and the forward portion of the cover 20 along the forward portion of the shoe upper 34. A heated tool, shown as a heated roller 44, which may be at a temperature of from 180° to 220° F., is run along the outside of the shoe cover adjacent the edge 40 to soften successive portions of the adhesive coating 22 and press the softened coating into engagement with the surface of the shoe upper 34 adjacent the edges to form a light bond. The covered shoe upper may then be placed on a last and subjected to pulling over and lasting. During the pulling over and lasting operations, the cover 20 stretches to conform to the lasted shape of the shoe upper 34.

Alternatively, the cover 20 may be applied and secured in place after lasting as shown in Fig. 4. In this procedure the cover 20 is placed on the lasted shoe upper 34 with the forepart cone of the last 36 extending through the opening 42 in the cover 20. The heated tool 44 is passed over the surface of the cover adjacent the featherline 46 of the shoe so that the cover is progressively heated and pressed against the shoe upper to form a bond to the shoe upper above the featherline, that is, upon the side of the featherline away from the shoe sole to be attached. The step of bonding the cover 20 adjacent the featherline 46 after lasting may also be employed as an additional step in the covering process where the cover is applied before lasting.

After the cover 20 has been bonded adjacent the featherline, the cover 20 is cut with shears or with a hot knife at a temperature of 350° to 450° F., at the featherline and the marginal portion below the featherline stripped off and discarded. Fig. 5 shows a covered shoe upper after trimming of the margins.

The shoe upper 34 may then be subjected to various shoemaking operations including the steps of roughing the overlasted margin of the upper, sole-attaching, sole-laying and sole-leveling. Thereafter at any convenient time the cover 20 may be stripped from the shoe.

It has been found that although pressures of from 300 to 600 lbs. or more per square inch are applied during shoemaking tending to press the cover against the shoe, for example the pressure exerted by the toe pad of the cement-sole-attaching machine, no significant increase in adhesion is developed between the cover and the shoe by this pressure.

Fig. 6 shows a modified form of shoe cover 50 comprising a flexible, stretchable sheet 52 provided with a coating of the special non-pressure-sensitive heat activatable adhesive. The sheet is bent along a line 54 extending lengthwise approximately in the center of the sheet and opposed margins 56 at one end of the sheet are secured together to provide a pocket for receiving the heel portion of a shoe upper on a last. This cover differs from the cover 20 of Fig. 1 in that the opening along the line of bend 54 extends only from a point which will be at an intermediate position on the heel cone of a last to a point which will be forward of the apex of the forepart of the last when the cover is in protective relation to a shoe upper on a last. This form of shoe cover is suitable for certain lasted women's shoes and provides an especially deep pocket for receiving the heel portion of a last.

The shoe cover 60 shown in Fig. 7 is similar to that shown in Fig. 1. The cover differs in that the edges of the opening 62 extend down at an angle from the line of bend 64 and that the portions 66 adjacent the line of fold from a point spaced from the toe to a point a short distance past the end of the opening are bonded together to give shape to the toe portion of the cover to make the cover easier to fit to a shoe. In this construction it is ordinarily desirable to leave in uncreased condition the portion of the cover which will protect the toe of the shoe during shoemaking to avoid impressing a mark on the shoe during leveling and other operations.

The shoe cover 70 of Fig. 8 is also similar to the cover 20 of Fig. 1 and differs only in that the cover has been permanently stretched, for example on a commercial "crimping machine," adjacent the end of the opening 72 so that it will conform more closely to the lasted shoe upper particularly in the area near the forepart cone of the last.

Fig. 9 shows a shoe cover 80 similar to the shoe cover 20 shown in Fig. 1 but having an angular notch 82 cut in the toe portion. The vertex 84 of the angle of the notch is in a position such that when the cover is positioned on a lasted shoe upper as shown in Fig. 10, the vertex 84 will be almost at the featherline at the tip of the shoe upper. Portions 86 and 88 adjacent the edges of the notch are then folded over to cover the toe portion of the shoe. This notched construction eliminates excess material which would be bunched up when the shoe cover was positioned on a shoe.

The following examples are given to aid in understanding the invention. It is to be understood that the invention is not limited to the specific ingredients or proportions, nor to special procedural details of the examples.

*Example I.*—A wax emulsion was prepared comprising 99 parts by weight of paraffin wax, 122 parts of water, 0.43 parts by weight of high viscosity carboxy methyl cellulose, 6 parts by weight of triethanolamine and 10 parts by weight of stearic acid. 40 parts by volume of the above emulsion were combined with 30 parts by volume of a 60% natural rubber latex and 10 parts by volume of a 50% solids content latex of a copolymer of butadiene and styrene in the ratio 25% butadiene and 75% styrene together with 0.2 part by volume of the dioctyl ester of sodium sulfosuccinic acid (Deceresol OT).

A sheet of rubber hydrochloride 0.0012 inch in thickness was given a very thin base coating of a solution of cyclized rubber in toluol. When this base coating dried, there was applied a 0.0020 inch thick coating of the blend of wax emulsion and the rubber and copolymer latices. This thick coating was permitted to dry. A section of this coated sheet was folded with the coated surface inward and the margins at one end were heated and pressed together to provide a pocket for the heel portion of a shoe on a last as described in connection with Figs. 1 and 2. This shoe cover was placed in protective relation to a lasted woman's white leather shoe upper with the heel portion of the shoe upper in the pocket of the cover. The cover was secured to the shoe upper by pressing it against the edge portions of the shoe upper adjacent to the featherline with a heated metal roller at a temperature of 200° F.

Portions of the cover extending below the edge of the shoe upper were trimmed off with a hot knife at a temperaturee of 400° F. The various shoemaking operations including roughening of the lasted margin, cement sole attaching and passage through a drying oven were then performed. The cover was then stripped off. Although the cover had been strongly pressed against the shoe, and the shoe and cover had been heated in a drying oven, it was found that the cover stripped off cleanly and easily and that the leather of the shoe upper was free from spots or stains.

*Example II.*—A sheet of rubber hydrochloride was given a base coating of cyclized rubber as in Example I. To the coated sheet there was applied a 0.0018 inch thick coating of a mixture of equal parts by volume of a wax emulsion prepared as in Example I and a GRS-3 latex. The GRS-3 latex is an emulsion of a copolymer of 50% styrene with 50% butadiene made under direction of the Rubber Reserve Corp. The coating was permitted to dry at room temperature. Shoe covers were made from the coated sheet material and employed for covering shoes as in Example I. When shoemaking operations were completed, the shoe cover was cleanly and easily stripped off.

*Example III.*—A sheet of rubber hydrochloride was given a base coating of cyclized rubber as in Example I. To the coated sheet there was applied an 0.0024 inch thick coating of a mixture of 20 parts by volume of a 10% solution of natural rubber in naphtha and 10 parts by volume of a 20% solution of polyethylene (polyethylene DEM-1866) in naphtha.

Polyethylene DEM-1866 is a low molecular weight polymer of ethylene having an average molecular weight of 2000 and a ball and ring softening point of 89.5° C. manufactured by the Bakelite Corporation.

The coated sheet was permitted to dry and shoe covers were made from the coated sheet material and employed for covering shoe uppers as in Example I. When shoemaking operations were completed on a covered shoe upper, the shoe cover was cleanly the easily stripped off.

Having described our invention, what we claim as new and desire to secure by Letters Patent of the United States is:

1. A temporary protective cover for application to the upper of a shoe to guard the upper against soiling during shoemaking operations comprising an integral, thin, flexible sheet conforming generally to the shape of and having a width and length to extend to the lasting margin of a shoe upper with a seamless portion for covering the forward part of the shoe upper and with the rear edge portions of the sheet secured together to hold the sheet in shoe conforming shape providing a pocket for receiving the heel portion of a shoe, and a layer of a heat-activatable adhesive bonded by an intervening adhesive precoat to the inner face of the sheet adapted to form, when heated and pressed against the shoe upper, a readily rupturable bond to a shoe to hold the cover in protective relation to the shoe during shoemaking, said heat-activatable adhesive comprising an intimate mixture of a wax having a melting point above 120° F. and an uncured thermoplastic rubber softenable by said wax when said wax is molten, said wax and uncured thermoplastic rubber being in the ratio of from 4:1 to 1:4 parts by weight and said mixture being non-tacky and non-pressure sensitive when cool.

2. A temporary protective cover for application to the upper of a shoe to guard the upper against soiling during shoemaking operations comprising an integral, thin, flexible, isomerized rubber sheet conforming generally to the shape of and having a width and length to extend to the lasting margin of a shoe upper with a seamless portion for covering the forward part of the shoe upper and with the rear edge portions of the sheet secured together to hold the sheet in shoe conforming shape providing a pocket for receiving the heel portion of a shoe, and a layer of a heat-activatable adhesive bonded by an intervening adhesive precoat to the inner face of the sheet adapted to form, when heated and pressed against the shoe upper, a readily rupturable bond to a shoe to hold the cover in protective relation to the shoe during shoemaking, said heat-activatable adhesive comprising an intimate mixture of paraffin wax, uncured natural rubber and a butadiene-styrene copolymer comprising from 50% to 75% styrene, the ratio of the wax to the combined weight of natural rubber and copolymer being from 1:2 to 2:1 parts by weight, the heat-activatable adhesive being non-tacky and non-pressure sensitive when cool.

STANLEY M. GRISWOLD.
HAROLD C. REYNOLDS, Jr.

References Cited in the file of this patent

UNITED STATES PATENTS

| Number | Name | Date |
|---|---|---|
| 2,031,673 | Schneider et al. | Feb. 25, 1936 |
| 2,275,814 | Abrams et al. | Mar. 10, 1942 |
| 2,335,124 | Konrad et al. | Nov. 23, 1943 |
| 2,376,777 | Kallander | May 22, 1945 |
| 2,410,878 | Harrington | Nov. 12, 1946 |
| 2,477,316 | Sparks et al. | July 26, 1949 |

OTHER REFERENCES

"Modern Plastics," pages 99 and 100, October 1948, Misc. Dig.

Vinylite Resins, published 1942 by Carbide and Carbon Chem. Corp, N. Y., page 7.

Quarles Canadian Paint and Varnish Magazine, April 15, 1946, page 18.